United States Patent
Chung et al.

(10) Patent No.: US 11,086,636 B2
(45) Date of Patent: *Aug. 10, 2021

(54) DATA STORAGE DEVICE AND METHOD FOR OPERATING NON-VOLATILE MEMORY

(71) Applicant: Silicon Motion, Inc., Jhubei (TW)

(72) Inventors: Chien-Chung Chung, Taipei (TW); Mei-Ting Lin, Gukeng Township (TW); Chen-Ning Yang, Kaohsiung (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/869,956

(22) Filed: May 8, 2020

(65) Prior Publication Data

US 2020/0264894 A1    Aug. 20, 2020

Related U.S. Application Data

(63) Continuation of application No. 16/016,168, filed on Jun. 22, 2018, now Pat. No. 10,684,864.

(30) Foreign Application Priority Data

Oct. 17, 2017   (TW) .................................. 106135474

(51) Int. Cl.
G06F 9/4401   (2018.01)

(52) U.S. Cl.
CPC .......... *G06F 9/4403* (2013.01); *G06F 9/4418* (2013.01)

(58) Field of Classification Search
CPC .. G06F 9/45558; G06F 21/575; G06F 9/4401; G06F 9/4406; G06F 2009/45575; G06F 9/4416

(Continued)

(56) References Cited

U.S. PATENT DOCUMENTS 6,004,134 A * 12/1999 Marcus ................... A63F 13/06
434/45
7,657,696 B2    2/2010 Su et al.

(Continued)

FOREIGN PATENT DOCUMENTS

| CN | 1530795 A | 9/2004 |
|---|---|---|
| TW | 201437805 A | 10/2014 |
| TW | 201723830 A | 7/2017 |

*Primary Examiner* — Faisal M Zaman
(74) *Attorney, Agent, or Firm* — McClure, Qualey & Rodack, LLP

(57) ABSTRACT

A data storage device waking up from a sleep mode rapidly is disclosed. The data storage device uses a controller to operate a non-volatile memory. The controller has a microprocessor and a volatile memory. The microprocessor loads boot code from the non-volatile memory to a not-always-on area of the volatile memory according to a script loaded on an always-on area of the volatile memory. The microprocessor executes the boot code loaded on the not-always-on area to load an in-system program from the non-volatile memory to the not-always-on area for execution of the in-system program. The script loaded on the always-on area is loaded from the non-volatile memory, and the non-volatile memory is searched to load the script to the always-on area in response to powering on a data storage device containing the non-volatile memory from a power-off state.

10 Claims, 12 Drawing Sheets

(58) Field of Classification Search
USPC .................................................. 713/1, 2, 100
See application file for complete search history.

(56) References Cited

U.S. PATENT DOCUMENTS

| | | | |
|---|---|---|---|
| 8,386,738 B1 | 2/2013 | Sun | |
| 8,447,983 B1 | 5/2013 | Beck et al. | |
| 8,589,667 B2 | 11/2013 | Mujtaba et al. | |
| 9,058,491 B1* | 6/2015 | Ahlquist | H04L 9/0841 |
| 2002/0103025 A1* | 8/2002 | Murzanski | A63F 13/06 |
| | | | 463/37 |
| 2005/0108500 A1 | 5/2005 | Kishida et al. | |
| 2005/0193100 A1 | 9/2005 | Woolf et al. | |
| 2005/0283598 A1 | 12/2005 | Gaskins et al. | |
| 2007/0028031 A1 | 2/2007 | Peterson et al. | |
| 2009/0254741 A1 | 10/2009 | Sun | |
| 2010/0169558 A1 | 7/2010 | Honda et al. | |
| 2010/0211616 A1 | 8/2010 | Khandelwal et al. | |
| 2011/0078433 A1 | 3/2011 | Bert | |
| 2012/0042376 A1 | 2/2012 | Dolgunov et al. | |
| 2014/0013097 A1 | 1/2014 | Wu | |
| 2014/0164810 A1 | 6/2014 | Isci et al. | |
| 2014/0298059 A1 | 10/2014 | Kao et al. | |
| 2015/0039874 A1* | 2/2015 | Schlanger | G06F 9/4401 |
| | | | 713/2 |
| 2016/0132256 A1 | 5/2016 | Jung | |
| 2016/0232088 A1 | 8/2016 | Mohan et al. | |
| 2016/0314040 A1* | 10/2016 | Yeh | G11C 29/52 |
| 2017/0177870 A1 | 6/2017 | Hildebrand | |
| 2017/0271022 A1 | 9/2017 | Watanabe et al. | |
| 2019/0012228 A1* | 1/2019 | Hsiao | G06F 11/076 |
| 2019/0034287 A1 | 1/2019 | Hsieh et al. | |

\* cited by examiner

| Offset | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0x0000 | | | | | | | Model123_DS | | | | | | | | | |
| 0x0010 | | | | | | | | | BootISP_2017 | | | | | 0x40180000 | | |
| 0x0020 | BtDSSecCnt | | Scnt | Cnt0 | Cnt1 | Cnt2 | Mode | Block | Page | CH/CE | Page | CH/CE | Page | CH/CE | ╳ | |
| 0x0030 | | | | | | | | | | | | | | | | |
| - | | | | | | | | NandCmdScript | | | | | | | | |
| - | ScriptSize | | | | | | | | | | | | | | | |
| ScriptSize | | | | | | | | | | | | | | | | |
| - | | | | | | | | InitFormDeviceSleepFlow | | | | | | | | |
| - | | | | | | | | | | | | | | | | |
| 0x07E0 | | | | | | | | | | | | | | | | |
| 0x0FF0 | | | | | | | | BootDS_Tail | | | | | | | | |

← 202

BootDS

| Address | Section | Content |
|---|---|---|
| | Boot2 | BootISP2 |
| 0x3FF0 | | BootISP2_Tail |
| 0x4000 | | Model123_Ext (0x40074000) |
| | | BootISP3 |
| 0x5780 | Boot3 | C_ROMCodeChecksum |
| 0x5790 | | BootISP3_Tail |
| 0x57A0 | | BootISP_HMAC |
| 0x57B0 | | BootISP_HMAC |
| 0x57C0 | | Super_Lightswitch |
| 0x57D0 | | Super_Lightswitch |
| 0x57E0 | | Super_Lightswitch_HMAC |
| 0x57F0 | | Super_Lightswitch_HMAC |

FIG. 2C

| Address | Content | Size |
|---|---|---|
| 0x4018_0000<br>-<br>-<br>-<br>-<br>-<br>0x4018_0FFF | BootDS | 4K |
| 0x4018_1000<br>-<br>-<br>-<br>-<br>-<br>-<br>-<br>-<br>-<br>0x4018_27FF | ParaInfo | 6K |
| 0x4018_2800<br>-<br>-<br>-<br>-<br>-<br>-<br>-<br>-<br>-<br>-<br>-<br>-<br>- | Reserved | 8K |

FIG. 3A-1

| | | |
|---|---|---|
| 0x4018_4800<br>-<br>-<br>-<br>-<br>-<br>- | ISP_variable | 4K |
| 0x4018_5800 | API_for_PS4 | 1K |
| 0x4018_5C00<br>-<br>- | Reserved | 1.5K |
| 0x4018_6200<br>-<br>- | Boot_use | 1.5K |
| 0x4018_6800<br>-<br>-<br>-<br>-<br>-<br>-<br>-<br>-<br>-<br>0x4018_7FFF | Reserved | 6K |

FIG. 3A-2

| Address | Content | Size |
|---|---|---|
| 0x4007_0000<br>-<br>-<br>-<br>-<br>-<br>0x4007_0FFF | BootDS | 4K |
| 0x4007_1000<br>-<br>-<br>-<br>-<br>-<br>-<br>-<br>-<br>0x4007_27FF | Boot1 | 6K |
| 0x4007_2800<br>-<br>-<br>-<br>-<br>-<br>-<br>-<br>-<br>0x4007_3FFF | Boot2 | 6K |
| 0x4007_2800<br>-<br>-<br>-<br>-<br>-<br>-<br>-<br>-<br>0x4007_3FFF | Boot2 | 6K |

FIG. 3B

| | |
|---|---|
| 0x4790 | BootISP3_Tail |
| 0x47A0 | BootISP_HMAC |
| 0x47B0 | |
| 0x47C0 | Super_Lightswitch |
| 0x47D0 | |
| 0x47E0 | Super_Lightswitch_HMAC |
| 0x47F0 | |

Boot3

FIG. 4C

DATA STORAGE DEVICE AND METHOD FOR OPERATING NON-VOLATILE MEMORY

CROSS REFERENCE TO RELATED APPLICATIONS

This application is a Continuation of U.S. patent application Ser. No. 16/016,168, filed on Jun. 22, 2018, now U.S. Pat. No. 10,684,864, which claims priority of Taiwan Patent Application No. 106135474, filed on Oct. 17, 2017, the entirety of which are incorporated by reference herein.

BACKGROUND OF THE INVENTION

Field of the Invention

The present invention relates to data storage devices and methods for operating non-volatile memory.

Description of the Related Art

There are various forms of non-volatile memory (NVM) for long-term data retention, such as flash memory, magnetoresistive RAM, ferroelectric RAM, resistive RAM, spin transfer torque-RAM (STT-RAM), and so on. A non-volatile memory may be combined with a controller to form a data storage device to be accessed by a host.

Considering the wear leveling of the different storage cells of a non-volatile memory, the physical space of a non-volatile memory is dynamically allocated for data storage. The physical space allocated to store a boot code (hereinafter represented by BootISP) may be different in the different non-volatile memories because of the different yield conditions of the different non-volatile memories. A controller of a data storage device needs to perform a time-consuming search of the non-volatile memory to get the boot code BootISP. When the data storage device wakes up from a sleep mode, this time-consuming search can be a considerable inconvenience to the user.

BRIEF SUMMARY OF THE INVENTION

A data storage device in accordance with an exemplary embodiment of the disclosure has a non-volatile memory and a controller. The microprocessor loads boot code from the non-volatile memory to a not-always-on area of the volatile memory according to a script loaded on an always-on area of the volatile memory. The microprocessor executes the boot code loaded on the not-always-on area to load an in-system program from the non-volatile memory to the not-always-on area for execution of the in-system program. The script loaded on the always-on area is loaded from the non-volatile memory, and the non-volatile memory is searched to load the script to the always-on area in response to powering on a data storage device containing the non-volatile memory from a power-off state.

In another exemplary embodiment, a method for operating a non-volatile memory is disclosed, comprising: providing a volatile memory that includes an always-on area and a not-always-on area; loading boot code from the non-volatile memory to the not-always-on area according to a script loaded on the always-on area; and executing the boot code loaded on the not-always-on area to load an in-system program from the non-volatile memory to the not-always-on area for execution of the in-system program. The script loaded on the always-on area is loaded from the non-volatile memory, and the non-volatile memory is searched to load the script to the always-on area in response to powering on a data storage device containing the non-volatile memory from a power-off state.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 2A, 2B, and 2C illustrate the script BootDS and the boot code BootISP (including three sections Boot1, Boot2, and Boot3) in accordance with an exemplary embodiment of the disclosure;

FIGS. 3A-1 and 3A-2 illustrate the contents of the always-on area 122 in accordance with an exemplary embodiment of the disclosure;

FIG. 3B illustrates the contents of the not-always-on area 124 in accordance with an exemplary embodiment of the disclosure;

FIGS. 4A, 4B, and 4C illustrate the contents stored in a flash memory of an old product for a booting procedure, including the three sections Boot1, Boot2, and Boot3 of boot code but not including the script BootDS shown in FIG. 2A-2C;

DETAILED DESCRIPTION OF THE INVENTION

Figure 1:
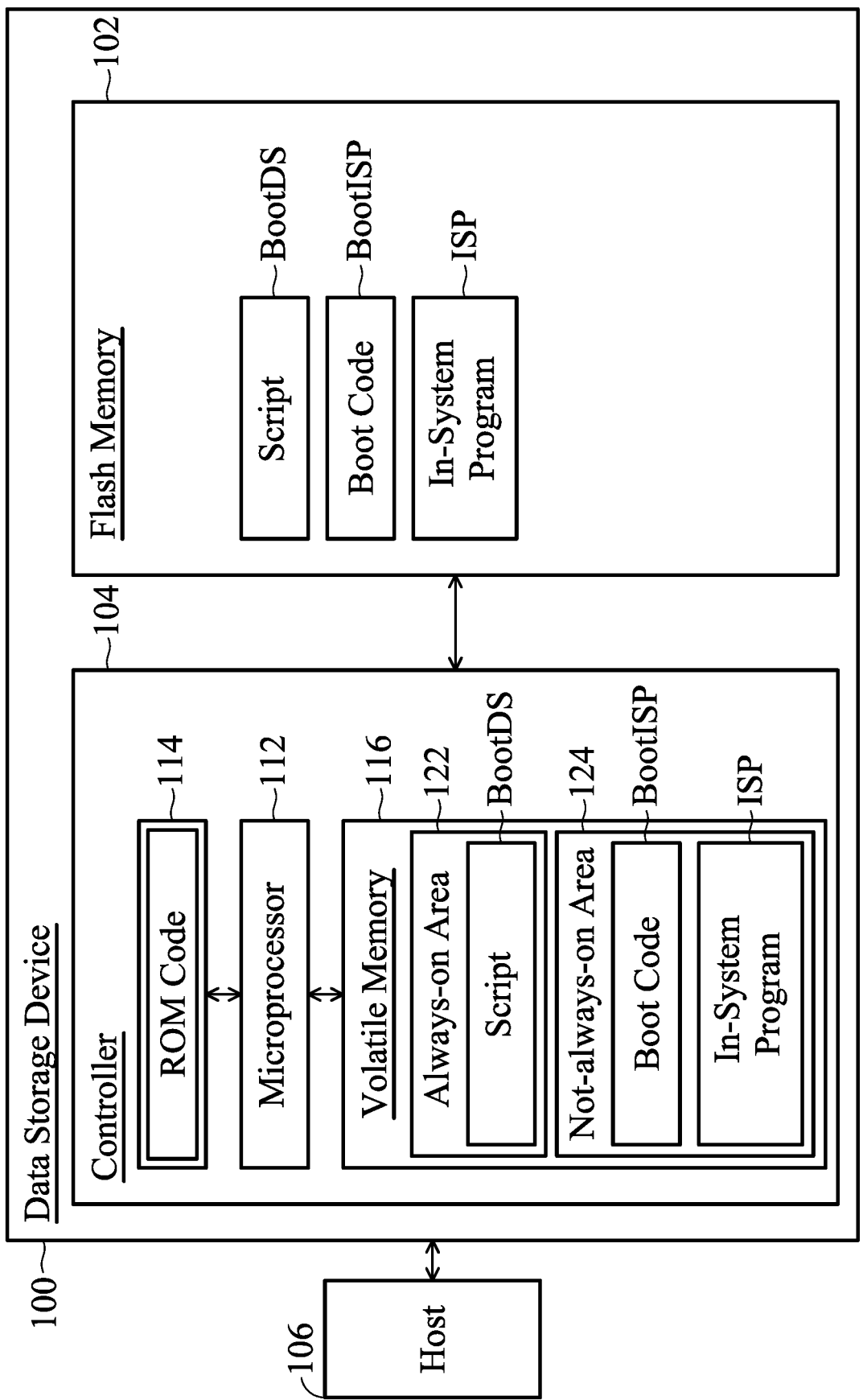
FIG. 1 is a block diagram, depicting a data storage device 100 in accordance with an exemplary embodiment of the disclosure.

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive RAM, a ferroelectric RAM, a resistive RAM, a spin transfer torque-RAM (STT-RAM) and so on. A non-volatile memory may be used to implement a data storage device or a data center. The following discussion is regarding flash memory in particular as an example.

A flash memory is often used as a storage medium in today's data storage devices, for implementations of a memory card, a USB flash device, an SSD and so on. In another exemplary embodiment, a flash memory is packaged with a controller to form a multiple-chip package and named eMMC. A data storage device using a flash memory as a storage medium can be applied to a variety of electronic devices, including a smartphone, a wearable device, a tablet computer, a virtual reality device, etc. A calculation module of an electronic device may be regarded as a host that operates a data storage device equipped on the electronic device to access a flash memory within the data storage device.

A data center may be built with flash memories as the storage medium. For example, a server may operate an array of SSDs to form a data center. The server may be regarded as a host that operates the SSDs to access the flash memories within the SSDs.

The host side distinguishes the flash memory storage contents by logical addresses (for example, according to a logical block address LBA or a global host page number GHP, etc.). In order to optimize the use of the flash memory, the storage space of the flash memory is dynamically allocated to correspond to logical addresses recognized by the host. For example, to avoid a damaged block, different physical areas may be allocated in the different flash memories to store the boot code BootISP.

Generally, the storage space of flash memory is divided into a plurality of blocks. Each block includes a plurality of pages. Each page may be further divided into a plurality of storage units. Multiple channels may be used in flash memory accessing. The multiple channels may be used alternately to access pages of data from the flash memory. In another example, data stored in the different areas corresponding to the different channels may be accessed at the same time. The boot code BootISP may be divided into sections to be stored in the same block or separated into different blocks. Each second of boot code BootISP is accessed according to a channel number and a page number. Alternatively, there may be other implementations of the spatial division of the flash memory.

Generally, the boot code BootISP is loaded from the flash memory prior to an in-system program (ISP). By executing the boot code BootISP, a booting procedure to power on the flash memory to leave a power-off or power-saving mode is completed. In the disclosure, a script BootDS to load the boot code BootISP is provided. The script BootDS is stored to an always-on area of a volatile memory. The volatile memory may be built in or attached to the controller of the flash memory. The script BootDS lists physical parameters which are required to access the flash memory for the boot code BootISP. For example, the physical parameters may indicate a channel, a physical address, and so on to read the boot code BootISP from the flash memory. When the data storage device is awakened from a sleep mode (for example, being switched from a power state S4 to a power state S1 defined in NVMe), the physical parameters for getting the boot code BootISP from the flash memory are obtained from the script BootDS. According to the obtained physical parameters, the controller gets the boot code BootISP without sequentially searching the flash memory. Without the complex searching, the controller efficiently gets the boot code BootISP. Specifically, the storage size of the volatile memory is not always occupied by of the boot code BootISP because the boot code BootISP generally is maintained in the non-volatile memory.

FIG. 1 is a block diagram, depicting a data storage device 100 in accordance with an exemplary embodiment of the disclosure.

The data storage device 100 includes a flash memory 102 and a controller 104. A host 106 may be coupled to the data storage device 100 to access the flash memory 102 through the controller 104. For a booting procedure, a boot code BootISP and a script BootDS for loading the boot code BootISP are stored in the flash memory 102. The flash memory 102 further stores an in-system program ISP to be loaded and executed after the booting procedure. The controller 104 includes a microprocessor 112, a read-only memory 114 and a volatile memory 116. The read-only memory 114 and/or the volatile memory 116 may be combined into the microprocessor 112 in structure. In some exemplary embodiments, the microprocessor 112, the read-only memory 114 and the volatile memory 116 are separately provided. The read-only memory 114 stores a read-only code (ROM code). The volatile memory 116 may be an SRAM (static random access memory), which is provided for temporary storage of program code, calculation results, mapping relationship between the host 106 and the flash memory 102, and so on. The following description focuses on the booting procedure.

As shown, the volatile memory 116 includes an always-on area 122 and a not-always-on area 124. When the data storage device 100 is switched from a normal operation mode (e.g. a power state 51) to a sleep mode (e.g. a power state S4), the always-on area 122 still has power and important data should be stored in the always-on area 122. In the disclosure, the always-on area 122 is utilized to store the information that is required to wake up the data storage device 100. According to the disclosure, the script BootDS is loaded from the flash memory 102 and stored in the always-on area 122. By executing the script BootDS maintained on the always-on area 122, the microprocessor 112 is directed to access the flash memory 102 for the boot code BootISP. When the data storage device 100 is recovered to the normal operation mode from the sleep mode, the microprocessor 112 loads the boot code BootISP from the flash memory 102 to the not-always-on area 124 for execution. By executing the boot code BootISP, the microprocessor 112 loads the in-system program ISP from the flash memory 102 to the not-always-on area 124 for execution. Compared to the boot code BootISP that contains the cumbersome booting programs, the script BootDS used for marking locations in the flash memory 102 has a relatively small code size. Only a small space of the always-on area 122 is occupied by the script BootDS. There is still plenty of room in the always-on area 122 for other applications. For example, in a smartphone, personal security information may be stored in the always-on area 122 to speed up waking up the data storage device 100.

In an exemplary embodiment, the script BootDS is maintained in the always-on area 122 after the booting procedure of the data storage device 100, to be used when the data storage device 100 is recovered from a sleep mode to a normal operation mode. When the data storage device 100 is started or restarted from a power-off state, the microprocessor 112 operates according to the ROM code provided in the read-only memory 114 to search the flash memory 102 in a preset manner. By searching the flash memory 102, the script BootDS and the boot code BootISP are obtained. The microprocessor 112 loads the script BootDS to the always-on area 122 and loads the boot code BootISP to the not-always-on area 124. In particular, the physical parameters (indicating locations in the flash memory 102) required for accessing the flash memory 102 for the boot code BootISP are filled to the script BootDS on the always-on area 122. In another exemplary embodiment, the booting procedure is performed earlier than the loading of the script BootDS. When the data storage device 100 is started or restarted from a power-off state, the microprocessor 112 searches the flash memory 102 for the boot code BootISP (without searching the script BootDS) and loads the boot code BootISP to the not-always-on area 124 for execution of the booting procedure. After the booting procedure, the microprocessor 112 loads the script BootDS to the always-on area 122 and writes the physical parameters required for accessing the flash memory 102 for the boot code BootISP to the script BootDS on the always-on area 122.

Figure 2B:
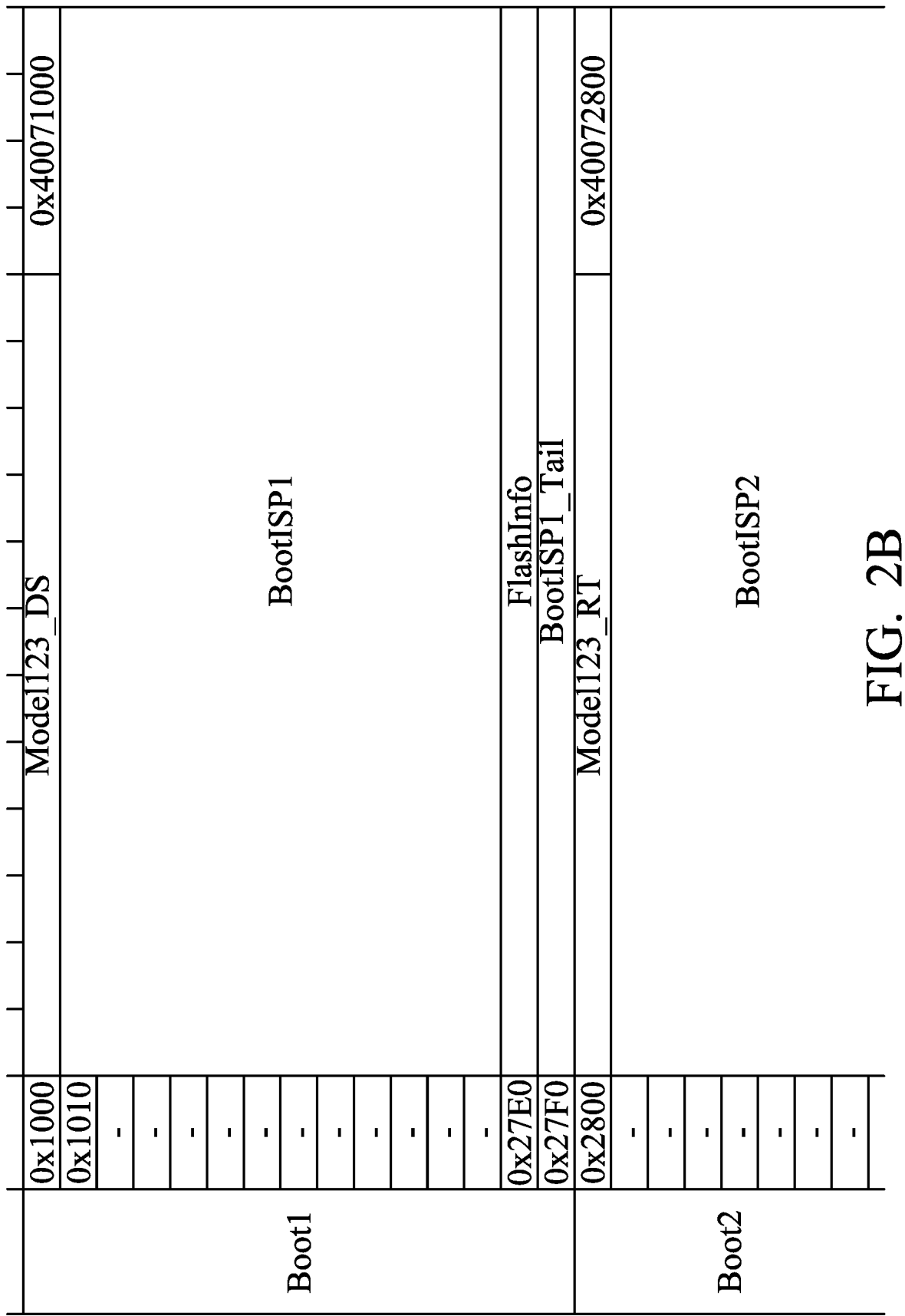

FIGS. 2A, 2B, and 2C illustrate the script BootDS and the boot code BootISP (including three sections Boot1, Boot2, and Boot3) in accordance with an exemplary embodiment of the disclosure.

The script BootDS has a tag "Model123_DS", and indicates an address "0x40180000" on the volatile memory 116 which is the address of the always-on area 122. In addition to a content label "BOOTISP 2017", the script BootDS includes a field 202 for filling in a variety of physical parameters (including BtDSSecCnt, Scnt, Cnt0, Cnt1, Cnt2, Mode, Block, and three sets of page number and CH/CE number) required for getting the boot code BootISP from the flash memory 102. The script BootDS further uses a field NandCmdScript to manage detailed script steps. The detailed script steps written to the field NandCmdScript depend on the physical parameters filled to the field 202. The field 202 and the field NandCmdScript are filled to the script BootDS on the always-on area 122 when the data storage device 100 is turned on from a power-off state and the flash memory 102 is scanned. The script BootDS further records a waking-up flow InitFormDeviceSleepFlow, which describes the power sequence to wake up the different components of the data storage device 100. The waking-up flow InitFormDeviceSleepFlow further directs to the field NandCmdScript to execute the detailed script steps. The ending tag is "BootDS_Tail".

The first section Boot1 of boot code also has the tag "Model123_DS". The first section Boot1 of boot code indicates an address "0x40071000" on the volatile memory 116 which is the address of the not-always-on area 124. The first section Boot1 of boot code includes code BootISP1, information FlashInfo about the flash memory 102, and an ending tag "BootISP1_Tail". In one embodiment, the location of the second section Boot2 of boot code in the flash memory 102 may be recorded in the code BootISP1. The first section Boot1 of boot code may be stored in the flash memory 102 subsequent to the script BootDS. For example, the first section Boot1 of boot code may be stored to the page storing the script BootDS.

The second section Boot2 of boot code has a tag "Model123_RT", and indicates an address "0x40072800" on the volatile memory 116 which is the address of the not-always-on area 124. The second section Boot2 of boot code includes code BootISP2 and an ending tag "BootISP2_Tail". In one embodiment, the location of the third section Boot3 of boot code in the flash memory 102 may be recorded in the code BootISP2.

The third section Boot3 of boot code has a tag "Model123 Ext", and indicates an address "0x40074000" on the volatile memory 116 which is the address of the not-always-on area 124. The third section Boot3 of boot code includes code BootISP3, an error checking field C_ROMCodeChecksum, an ending tag "BootISP3_Tail", and other fields (BootISP_HMAC, Super_Lightswitch, Super_Lightswitch_HMAC).

FIGS. 3A-1 and 3A-2 illustrate the contents of the always-on area 122 in accordance with an exemplary embodiment of the disclosure. The storage space of the always-on area 122 is 32K. In addition to the parameters ParaInfo, ISP_variable, API_for_PS4, and Boot_use required for operating the flash memory 102, the always-on area 122 stores the script BootDS which is only 4K. Unlike conventional technologies wherein a large amount of storage space of an always-on area is occupied for a booting procedure, only a small space of the always-on area 122 is used in the disclosure for a booting procedure. The saved storage space can be used to store other important data or for implementing other applications to speed up awaking the data storage device 100.

FIG. 3B illustrates the contents of the not-always-on area 124 in accordance with an exemplary embodiment of the disclosure. The script BootDS and the first section Boot1 of boot code stored in the same page may be loaded to the not-always-on area 124 together as shown. After the first section Boot1 of boot code, the second section Boot2 and the third section Boot3 of boot code are loaded to the not-always-on area 124. The three sections Boot1, Boot2 and Boot3 of boot code loaded to the not-always-on area 124 do not occupy the always-on area 122. The script BootDS loaded in the not-always-on area 124 may be moved to or backed up in the always-on area 122.

Figure 4A:
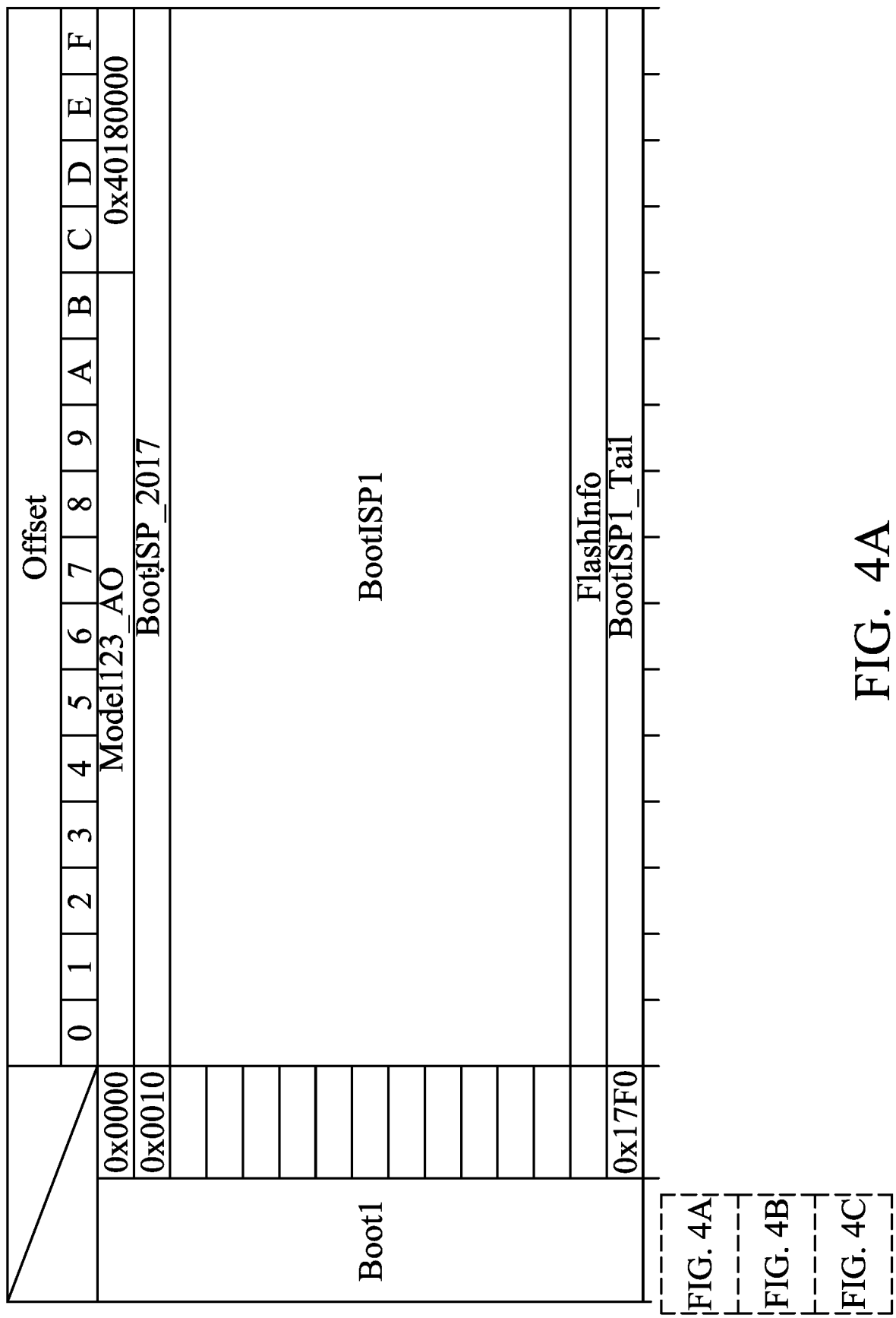
Figure 4B:
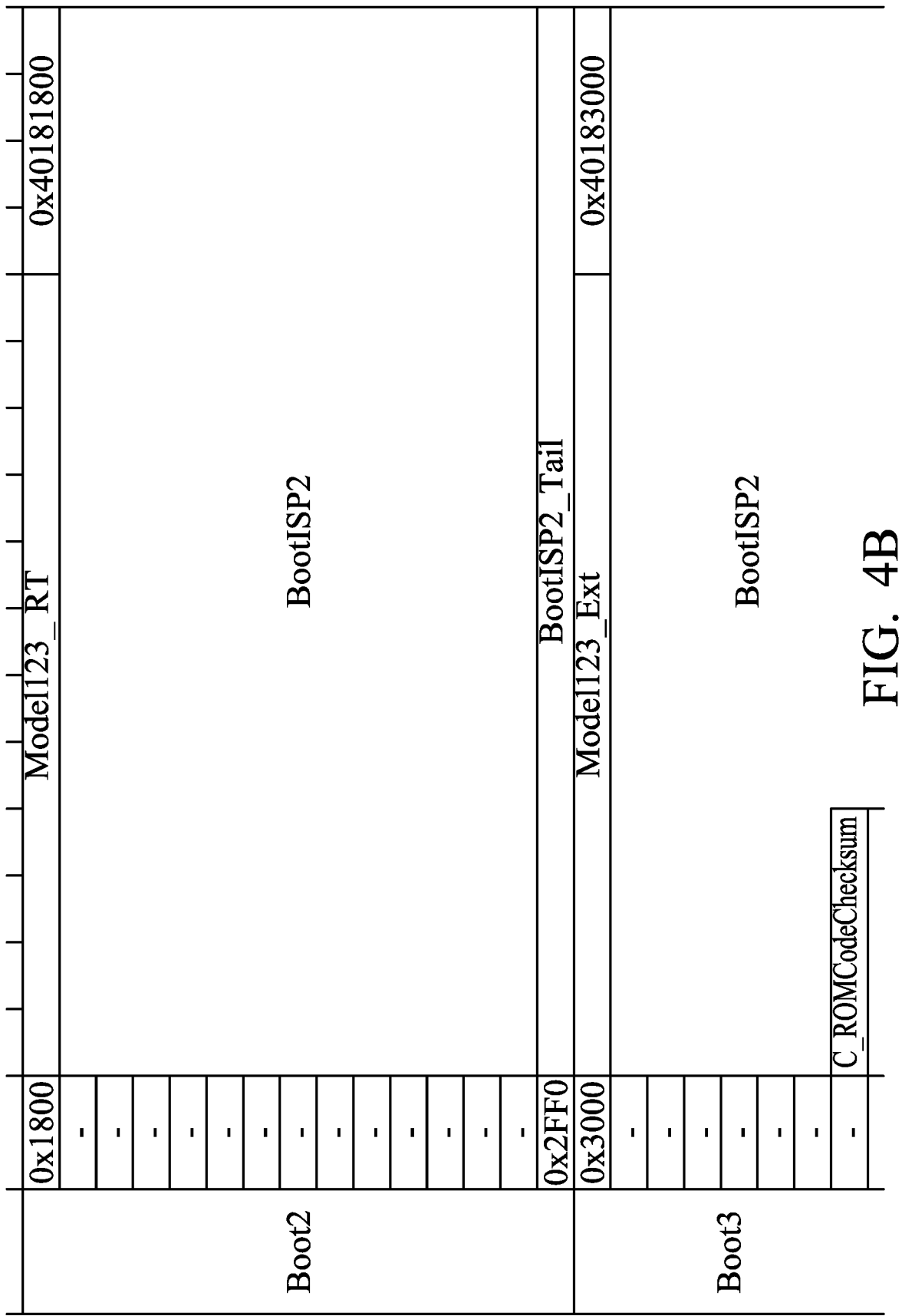

FIGS. 4A, 4B, and 4C illustrate the contents stored in a flash memory of an old product for a booting procedure, including the three sections Boot1, Boot2, and Boot3 of boot code but not including the script BootDS shown in FIG. 2A-2C. As shown in FIG. 4A, the first section Boot1 of boot code has a tag "Model123_AO", ended by "AO", different from the tag "Model123_DS" (ended by "DS") shown in FIG. 2A. Specifically, the three sections Boot1, Boot2, and Boot3 of boot code indicate three addresses ("0x40180000", "0x40181800", and 0x40183000") on the always-on area 122 rather than the not-always-on area 124. A large space of the always-on area 122 is occupied by the boot code BootISP to awake the data storage device 100.

Figure 5:
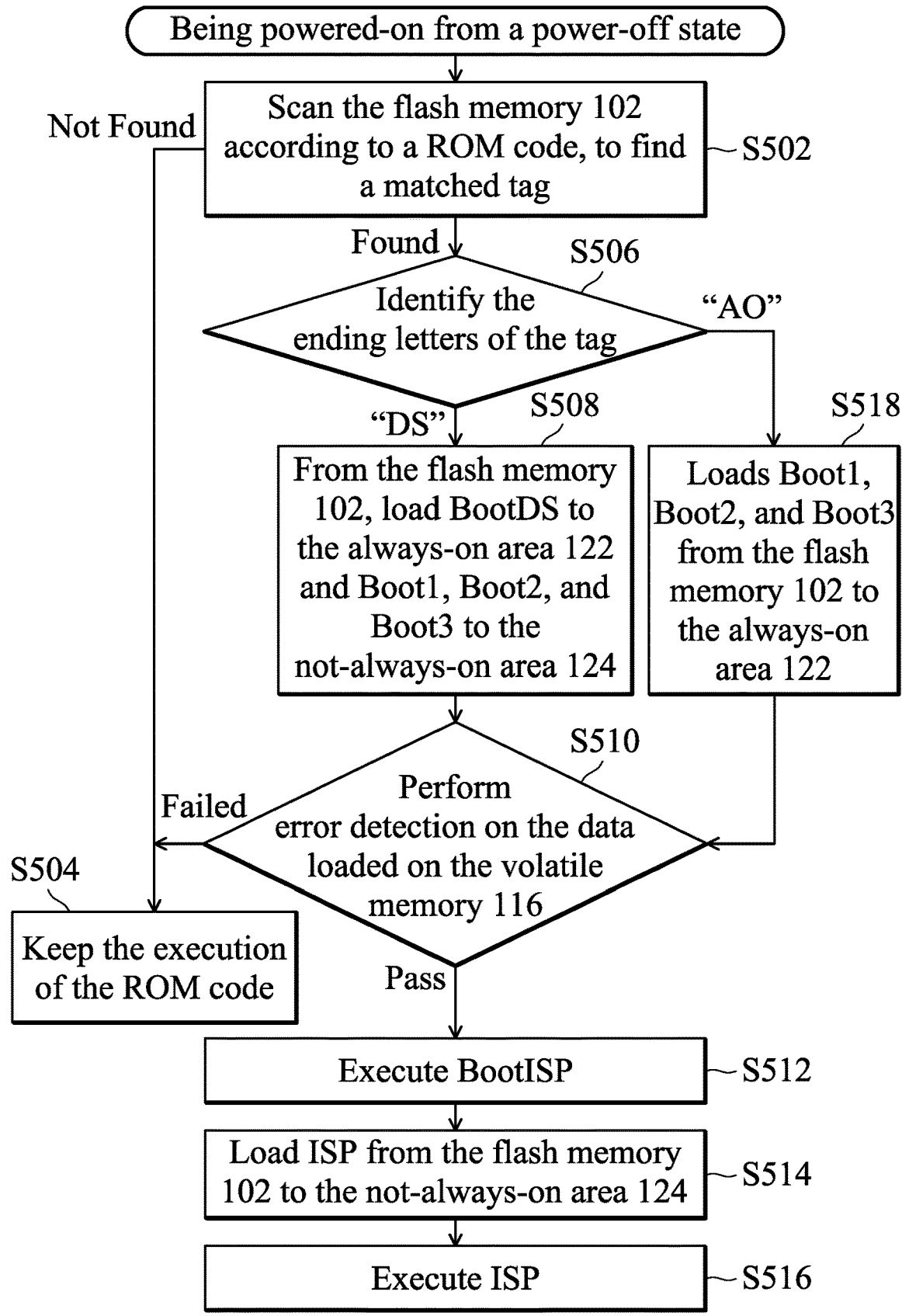
FIG. 5 is a flowchart, depicting a power-on action of a data storage device which is powered on from a power-off state.

Considering the compatibility of old and new products, an operating flow for the data storage device 100 is proposed. FIG. 5 is a flowchart, depicting a power-on action of a data storage device which is powered on from a power-off state. In step S502, the microprocessor 112 scans the flash memory 102 according to a ROM code, to find a matched tag. When there is no matched tag, step S504 is performed and the microprocessor 112 keeps the execution of the ROM code. When there is a matched tag, step S506 is performed to further identify the ending letters of the tag. When the tag ends with "DS" (i.e. the tag "Model123_DS" of the script BootDS shown in FIG. 2A), step S508 is performed. The microprocessor 112 loads the script BootDS from the flash memory 102 to the always-on area 122 of the volatile memory 116, and loads the three sections Boot1, Boot2, and Boot3 constituting the boot code BootISP from the flash memory 102 to the not-always-on area 124 of the volatile memory 116. In this step, parameters are filled to the script BootDS on the always-on area 122. The parameters include: the control parameters Cnt0, Cnt1, Cnt2 and the operation mode Mode (SDR or DDR mode) read from the flash memory 102 for the access of the three sections Boot1, Boot2, and Boot3 of boot code; the block numbers (Block) of the three different sections Boot1, Boot2, and Boot3 of boot code; the page numbers (Page) of the three different sections Boot1, Boot2, and Boot3 of boot code; and the channel (CH) or chip enable signal (CE) corresponding to the three different sections Boot1, Boot2, and Boot3 of boot code. In step S510, error detection is performed on the data loaded on the volatile memory 116. The error detection may be performed based on the fields at the end of the section Boot3 of boot code, like C_ROMCodeChecksum, BootISP_HMAC, Super_Lightswitch, Super_Lightswitch_HMAC, etc. When uncorrectable error is detected, it means that unauthorized amendments may be made on the sections Boot1, Boot2, and Boot3 of boot code. Step S504 is performed and the microprocessor 112 keeps the execution of the ROM code. When no uncorrectable error exists, step S512 is performed to execute the boot code BootISP loaded on the not-always-on area 124. Then, the in-system program ISP is loaded from the flash memory 102 to the not-always-on area 124 by step S514 and executed by step S516. In another exemplary embodiment, the microprocessor 112 executes the in-system program ISP before filling parameters to the script BootDS. By the execution of the in-system program ISP, the microprocessor 112 is switched to operate according to a high-speed clock. At the high-speed operation mode, the microprocessor 112 writes the detailed script steps to the field NandCmdScript of the script BootDS on the always-on area 122, including recording a script size Scnt.

When the flash memory 102 is an old product and the stored information for booting is as shown in FIG. 4A-4C, step S506 recognizes that the tag ends with "AO" (i.e. the tag "Model123_AO" of the section Boot1 of boot code shown in FIG. 4A), step S518 is performed. The microprocessor 112 loads the three sections Boot1, Boot2, and Boot3 constituting the boot code BootISP from the flash memory 102 to the always-on area 122 of the volatile memory 116. When no uncorrectable error is detected in step S510, step S512 is performed to execute the boot code BootISP loaded on the always-on area 122 and then steps S514 and S516 are performed.

Figure 6:
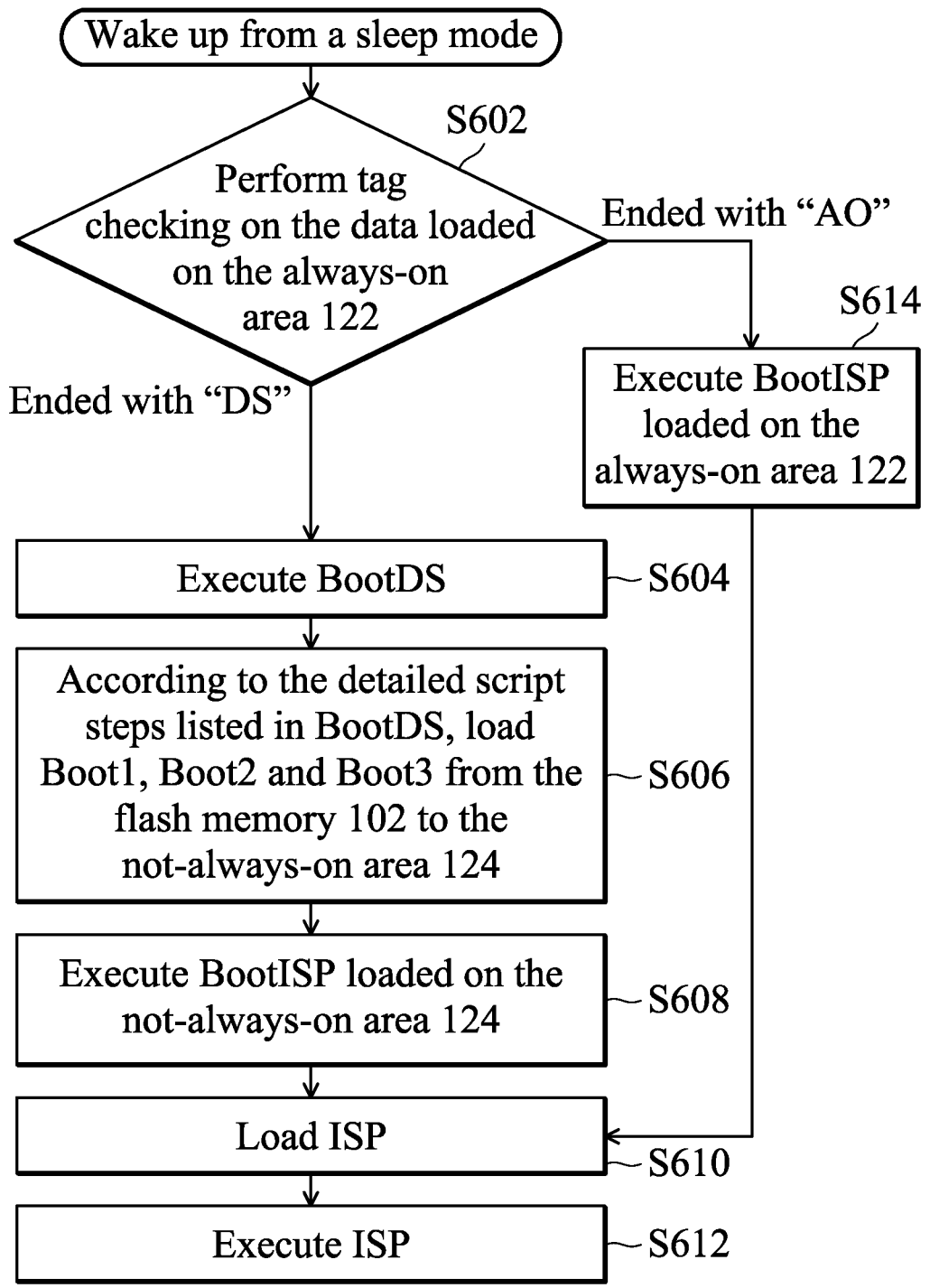
FIG. 6 is a flowchart illustrating the power-on action of the data storage device 100 to wake up from a sleep mode.

FIG. 6 is a flowchart illustrating the power-on action of the data storage device 100 to wake up from a sleep mode. In step S602, the microprocessor 112 performs tag checking on the data loaded on the always-on area 122 of the volatile memory 116. A tag ending with "DS" means that a script BootDS has been loaded on the always-on area 122 so that step S604 is performed and the microprocessor 112 operates according to the script BootDS. The components of the data storage device 100 are power on in the order described in to the waking-up flow InitFormDeviceSleepFlow, and the detailed script steps listed in the field NandCmdScript are performed. In step S606, according to the detailed script steps, the three sections Boot1, Boot2 and Boot3 of boot code are loaded from the flash memory 102 to the not-always-on area 124 of the volatile memory 116. In step S608, the boot code BootISP composed of the three sections Boot1, Boot2, and Boot3 on the not-always-on area 124 is executed. Then, the in-system program ISP is loaded from the flash memory 102 to the not-always-on area 124 in step S610 and executed in step S612.

When a tag ending with "AO" is obtained from the always-on area 122 in step S602, it means that a boot code BootISP composed of three sections Boot1, Boot2, and Boot3 is loaded on the always-on area 122. Step S614 is performed and the microprocessor 112 executes the boot code BootISP loaded on the always-on area 122. Then, the in-system program ISP is loaded from the flash memory 102 to the not-always-on area 124 in step S610 and executed in step S612.

The flow introduced in FIGS. 5 and 6 make the old and new products compatible.

Other techniques that load a boot code BootISP on the not-always on area 124 and loads a script BootDS (for loading the boot code BootISP) on the always-on area 122 are within the scope of the disclosure. Based on the above contents, the present invention further relates to methods for operating a non-volatile memory.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller operating the non-volatile memory, including a microprocessor and a volatile memory,
wherein:
the microprocessor loads boot code from the non-volatile memory to a not-always-on area of the volatile memory according to a script loaded on an always-on area of the volatile memory;
the microprocessor executes the boot code loaded on the not-always-on area to load an in-system program from the non-volatile memory to the not-always-on area for execution of the in-system program; and
the script loaded on the always-on area is loaded from the non-volatile memory, and the microprocessor searches the non-volatile memory to load the script to the always-on area in response to powering on the data storage device from a power-off state.

2. The data storage device as claimed in claim 1, wherein:
when searching the non-volatile memory, the microprocessor gets where the boot code is on the non-volatile memory and writes an address of the boot code on the non-volatile memory to the script loaded on the always-on area.

3. The data storage device as claimed in claim 2, wherein:
the microprocessor loads the boot code gotten by searching the non-volatile memory to the not-always-on area for execution of the boot code;
by executing the boot code, the microprocessor loads the in-system program from the non-volatile memory to the not-always-on area for execution of the in-system program; and
by executing the in-system program, the microprocessor writes detailed script actions to the script loaded on the always-on area.

4. The data storage device as claimed in claim 3, wherein:
the microprocessor executes the script loaded on the always-on area when the data storage device wakes up from a sleep mode.

5. The data storage device as claimed in claim 4, wherein:
the always-on area further stores personal security information to speed up the data storage device to wake up from the sleep mode.

6. A method for operating a non-volatile memory, comprising:
providing a volatile memory that includes an always-on area and a not-always-on area;
loading boot code from the non-volatile memory to the not-always-on area according to a script loaded on the always-on area; and
executing the boot code loaded on the not-always-on area to load an in-system program from the non-volatile memory to the not-always-on area for execution of the in-system program,
wherein the script loaded on the always-on area is loaded from the non-volatile memory, and the non-volatile memory is searched to load the script to the always-on area in response to powering on a data storage device containing the non-volatile memory from a power-off state.

7. The method as claimed in claim 6, wherein:
by searching the non-volatile memory, an address of the boot code on the non-volatile memory is obtained to be written to the script loaded on the always-on area.

8. The method as claimed in claim 7, further comprising:
loading the boot code gotten by searching the non-volatile memory to the not-always-on area for execution of the boot code;
by executing the boot code, loading the in-system program from the non-volatile memory to the not-always-on area for execution of the in-system program; and
by executing the in-system program, writing detailed script actions to the script loaded on the always-on area.

9. The method as claimed in claim 8, wherein:
the script loaded on the always-on area is executed when the data storage device wakes up from a sleep mode.

10. The method as claimed in claim 9, wherein:
the always-on area further stores personal security information to speed up the data storage device to wake up from the sleep mode.

\* \* \* \* \*